United States Patent [19]

Dowd

[11] Patent Number: 5,537,109
[45] Date of Patent: Jul. 16, 1996

[54] CAPACITIVE TRANSDUCING WITH FEEDBACK

[75] Inventor: Roger D. Dowd, Watertown, Mass.

[73] Assignee: General Scanning, Inc., Watertown, Mass.

[21] Appl. No.: 69,145

[22] Filed: May 28, 1993

[51] Int. Cl.⁶ .......................... G08C 19/10; G08C 19/16; G01R 27/26
[52] U.S. Cl. ...................... 340/870.37; 324/658; 324/686
[58] Field of Search ....................... 340/870.37; 324/658, 324/660, 686, 688, 690; 200/600; 341/33

[56] References Cited

U.S. PATENT DOCUMENTS

| | | |
|---|---|---|
| 2,461,832 | 2/1949 | Meacham . |
| 2,480,187 | 8/1949 | Gamertsfelder . |
| 2,534,450 | 12/1950 | Ergen . |
| 2,719,192 | 9/1955 | Rex . |
| 2,745,993 | 5/1956 | Foster . |
| 3,012,192 | 12/1961 | Lion . |
| 3,238,523 | 3/1966 | Masel et al. . |
| 3,253,207 | 5/1966 | Jauch . |
| 3,306,104 | 2/1967 | Corcoran . |
| 3,323,049 | 5/1967 | Hanken . |
| 3,337,789 | 8/1967 | Ono et al. . |
| 3,421,371 | 1/1969 | Williams, Jr. . |
| 3,517,282 | 6/1970 | Miller . |
| 3,566,222 | 2/1971 | Wolfendale . |
| 3,577,072 | 5/1971 | Miller . |
| 3,668,672 | 6/1972 | Parnell . |
| 3,694,721 | 9/1972 | Henry . |
| 3,702,957 | 11/1972 | Wolfendale . |
| 3,706,919 | 12/1972 | Abbe . |
| 3,727,137 | 4/1973 | Barron . |
| 3,732,553 | 5/1973 | Hardway, Jr. . |
| 3,742,347 | 6/1973 | Walton . |
| 3,775,678 | 11/1973 | Abbe . |
| 3,775,679 | 11/1973 | Abbe . |
| 3,795,984 | 3/1974 | Meyer . |
| 3,944,792 | 3/1976 | Sautner . |
| 3,970,979 | 7/1976 | Montagu . |
| 3,986,109 | 10/1976 | Poduje . |
| 3,990,005 | 11/1976 | Abbe et al. . |
| 4,001,676 | 1/1977 | Hile et al. . |
| 4,066,958 | 1/1978 | Burke, Jr. . |
| 4,092,579 | 5/1978 | Weit . |
| 4,110,879 | 9/1978 | Burke, Jr. . |
| 4,142,144 | 2/1979 | Rohr . |
| 4,153,873 | 5/1979 | Grindheim . |
| 4,168,464 | 9/1979 | Coulson et al. . |
| 4,177,421 | 12/1979 | Thornburg . |
| 4,189,699 | 2/1980 | Burke, Jr. . |
| 4,206,401 | 6/1980 | Meyer . |
| 4,228,393 | 10/1980 | Pile . |
| 4,234,139 | 11/1980 | Porchia . |

(List continued on next page.)

OTHER PUBLICATIONS

Alloca, John A., "Capacitive Transducers", Theory and application, Chapter 4, pp. 89–104, 1984.
Foldvari et al., CAPACITIVE TRANSDUCERS, Nov.., 1964.
Jones, "The Design and Some Applications of Sensitive Capacitance Micrometers", Instruments and Experiences, 1988, pp. 219–239.
Lion, INSTRUMENTS IN SCIENTIFIC RESEARCH, 1959, New York.

Primary Examiner—Edward L. Coles, Sr.
Assistant Examiner—Thomas D. Lee
Attorney, Agent, or Firm—Fish & Richardson

[57] ABSTRACT

A variable capacitance high precision, stable transducer for detecting position of a moving member including a first stationary conducting surface connected to a source, a second surface with at least two conducting, sensing regions and a third movable conductive surface located between the first surface and the second surface and connected to the moving member. The third surface is adapted to modulate charge transfered from the source surface before reaching the sensing regions. The difference of signals detected at the individual sensing regions is utilized to determine the position of the moving member and the sum of the signals is utilized to achieve appropriate correction in a feedback loop connected to the source.

19 Claims, 6 Drawing Sheets

U.S. PATENT DOCUMENTS

| | | |
|---|---|---|
| 4,238,781 | 12/1980 | Vercellotti et al. . |
| 4,244,219 | 1/1981 | Takahashi . |
| 4,247,796 | 1/1981 | Florentino et al. . |
| 4,264,942 | 4/1981 | Iri et al. . |
| 4,268,889 | 5/1981 | Wolfendale . |
| 4,336,483 | 6/1982 | Smith . |
| 4,694,235 | 9/1987 | Flowers . |
| 4,755,731 | 7/1988 | Anthony et al. . |
| 4,864,295 | 9/1989 | Rohr . |
| 4,867,560 | 9/1989 | Kunitsugu . |
| 5,099,386 | 3/1992 | Stokes et al. . |

CAPACITIVE TRANSDUCING WITH FEEDBACK

BACKGROUND OF THE INVENTION

This invention relates to capacitive transducers and, more particularly, to capacitive transducers with a feedback control.

Capacitive transducers are widely used to measure displacement or rotation of an element, such as the linear position of a machine tool or the angular position of a mirror or of an optical grating. They offer many advantages as they can be made to resolve extremely small motions, such as the tilt of a coastline with tidal changes, they are relatively inexpensive to build, they can report values of position nearly instantaneously, and they can be made using lightweight parts since it is important not to significantly increase the inertia of the instrumented element.

As described in many publications, capacitive transducers for sensing rotary motion include at least two fixed capacitance plates and a moving member mounted on a centrally located rotating shaft. The transducers can be divided into two types. The first type has a dielectric plate as the moving member, and the second has a conducting plate as the moving member. The moving dielectric member is shaped to alter the dielectric constant and, in turn, the capacitance of the transducer depending on its rotary position. The moving conducting plate is kept at the same potential as one of the electrodes and is shaped to prevent energy transfer from one electrode to the other depending on its instantaneous position.

The first type of capacitive transducers is disclosed in U.S. Pat. No. 3,517,282 to Arthur Miller. The transducer includes two stationary capacitor plates spaced apart and a dielectric plate mounted in between on a centrally located rotatable shaft. The capacitance between the stationary plates depends on the position of the rotating dielectric plate. The dielectric plate may have regions coated with a metallic material.

In U.S. Pat. No. 4,864,295, Rohr also describes the moving dielectric capacitance sensing system. The capacitance system is formed by two cooperating fixed capacitive members; the first one is made of a ring shaped plate enclosing a rotating shaft, and the second is made of four arcuate segments symmetrically positioned with respect to the shaft. Located in between the two fixed members is the moving dielectric member mounted on the shaft. The dielectric member has a butterfly shape and changes the capacitance depending on the rotary position of the shaft. The system also includes an additional capacitor, Cr, not affected by the moving dielectric but to some extent by the field of the two capacitive members, which is described to detect capacitance changes due to temperature variations. The output from the Cr capacitor is connected in a AGC feedback arrangement to the oscillator that drives the capacitance sensing system.

The second type of capacitive transducers is described by Parnell in U.S. Pat. No. 3,668,672. The transducer includes three conductive plates arranged in parallel, wherein two outer plates are stationary and the inner plate is mounted on a rotatable shaft. An electrical source signal is applied to one of the outer plates while the other outer plate, called receptor plate, and the inner plate, called screen plate, are maintained at substantially the same potential. The capacitance of the transducer, measured at the receptor plate, varies depending on the position of the screen plate that corresponds to the position of the shaft.

In U.S. Pat. No. 3,732,553, Hardway, Jr. discloses an improvement of the capacitive transducer of Parnell. The source plate of the transducer is divided into $2^n$ sectors and each sector is connected to one of two sources of input electrical signals of opposite phase. The shield plate includes $2^{n-1}$ shielding lobes and the receptor plate includes $2^n$ active areas connected to the amplifier. The shield plate is maintained at ground or at some low signal value with respect to the input signals, and the amplifier includes a negative feedback circuit which clamps the signal level on the active areas to some low signal level with respect to the input signals. This arrangement is described to minimize the effect of stray capacitances and fringing between the capacitances. The capacitances are aligned with respect to each other so that a null or no signal position is obtained when the capacitance between the active areas and the sectors of the source plate connected to input signals of one phase, equals the capacitance between these active areas and the other sectors of the source plate connected to input signals of opposite phase. Movement of the shield plate in one specified direction from the null position upsets this balance in the opposite direction from the null position and results in a negative output signal. The amplitude of the output signals is proportional to the distance moved in the respective direction.

Frequently, a capacitive transducer is used in conjunction with a motion actuator that dissipates heat. The heat causes errors between the reported position values obtained during their initial calibration and the position values actually obtained in operation. This is the case, for example, in optical scanners, wherein a limited rotation motor drives a shaft with a mirror mounted thereon. For many reasons, such as preserving the dynamic bandwidth of the device, it is of interest to keep the capacitative sensor tightly coupled mechanically to the drive motor. Such tight coupling creates a path for heat conduction and exposes the transducer to the heat dissipation of the motor. While it is possible to measure the errors introduced by such heat transfer and to develop appropriate corrections for the transducer, it is costly and impractical to do so. Similar errors are induced by ambient temperature level changes and by the aging of components.

The above-described errors may be eliminated by calibrating the output of the transducer at sufficiently frequent intervals. The calibration is done at known angular positions by causing the scanner to address these positions. The output values are then compared to those obtained during the original calibration to generate appropriate corrections in the system driving the scanner. This technique requires that the useful scan function be temporarily interrupted more or less frequently to perform the calibration, and it also adds system complexity by the addition of optical components and the routines required for calibration and scan correction.

There is still a need for a capacitive transducer that is stable with respect to the commonly observed tendency for the output of all capacitive transducers to drift when their structures or the electrical circuits connected thereto age or are exposed to heat sources or to changes of ambient temperature and humidity.

SUMMARY OF THE INVENTION

The invention, in general, is a position transducer comprising a stationary source member with a source of energy, a cooperating, spaced apart, stationary member with a plurality of sensing regions, and a moving member adapted to modulate signal from the source member before it reaches the sensing regions. The amount of signal detected at the individual sensing regions is utilized to determine the position of the moving member and achieve appropriate correction in a feedback loop connected to the source.

In one aspect, the invention features a variable capacitance transducer for detecting position of a moving member. The transducer includes a first stationary conductive source surface, connected to a source of oscillating electrical energy; a second stationary surface, spaced apart from the first surface by a gap, comprising a plurality of electrically conductive sensing regions cooperatively arranged with the source surface; and a third movable conductive surface, connected to the moving member, located between the first source surface and the plurality of sensing regions. The third conductive surface is shaped and arranged to limit the amount of electrical energy transferred from the source surface to the plurality of sensing regions in direct dependence with a relative position of the third surface respective to the first and second surfaces. The transducer also includes an electrical connecting circuit, connected to the sensing regions and the third surface, adapted to maintain the sensing regions and the third surface at substantially the same potential; an electrical measurement circuit, connected to each of the sensing regions, constructed and arranged to measure the relative position of the third surface based on the amount of energy received by individual sensing regions; and an electrical control circuit, connected to the electrical measurement circuit and the source in a feedback arrangement, constructed to control the amount of energy the source applies to the source surface based on the amount of energy received by the sensing regions.

Preferred embodiments of this aspect include one or more of the following features.

The measurement circuit is constructed and arranged to measure the difference of energy received by the sensing regions to determine the relative position.

The measurement circuit is further constructed and arranged to measure the sum of energy received by the sensing regions.

The control circuit utilizes the sum of energy to control the amount of energy the source applies to the source surface.

The third conductive movable surface is adapted to move in translation in respect to the first and second surfaces or is adapted to rotate in respect to the first and second surfaces.

The capacitance transducer may further comprise a first electrical output terminal connected to a first set of regions of the second surface; and a second electrical output terminal connected to a second set of regions of the second surface. The third surface has such shape that, when rotating, is increases the area of the first set of regions exposed to the first surface and symmetrically decreases the area of the second set of regions exposed to the first surface.

The first conductive source surface is flat and defined by two concentric circles with an identical axis of symmetry. The electrically conductive sensing regions of the second surface are formed by four arcuate flat regions defined by arcs of two concentric circles with the same axis of symmetry. The shape of the third surface is symmetric about the axis and includes at least two lobes.

In another aspect, the invention features a transducer that includes a common annular source electrode excited by an oscillating voltage and a cooperating surface comprising four sensing conducting regions symmetrically disposed about a central axis in an annular arrangement. Each quadrant region is connected to the ground of a source of excitation voltage through a current sensing circuit. The rotating member comprises an axially-symmetric pair of conducting shielding sector plates interposed between the source electrode and the sensing electrodes and connected to ground in a manner that matches closely the voltage of the sensing electrodes. The rotation of the shielding sector plate increases the exposed area of one diametrically opposite pair of sensing quadrant electrodes to the common electrode and decreases the exposed area of the other pair, thereby causing a difference between the currents sensed by the current sensing circuits.

The above-summarized preferred embodiments, including shielding the conductors carrying the excitation voltage, achieve the following advantages: The sensed currents do not include any components due to stray capacitance; this permits very accurate measurement of the movement of the rotating member. The capacitance between the excited electrode and ground can be kept very close to that formed with the sensing electrodes, thereby minimizing the load on the excitation source; this permits attaining the highest excitation frequencies, and thus the highest sensitivity. In comparison to the moving dielectric member, the present invention avoids non-linearities injected by local variations of dielectric properties within the dielectric or due to variations in its thickness. In addition, the present invention avoids the complexities inherent in compensating for temperature changes, when the sensing electrodes measure currents arising from excitation of one set of capacitors of variable geometry with capacitance dependent on the dielectric constant of the rotating dielectric and another set with capacitance dependent on the dielectric constant of air.

DESCRIPTION OF THE PREFERRED EMBODIMENT

Figure 1:
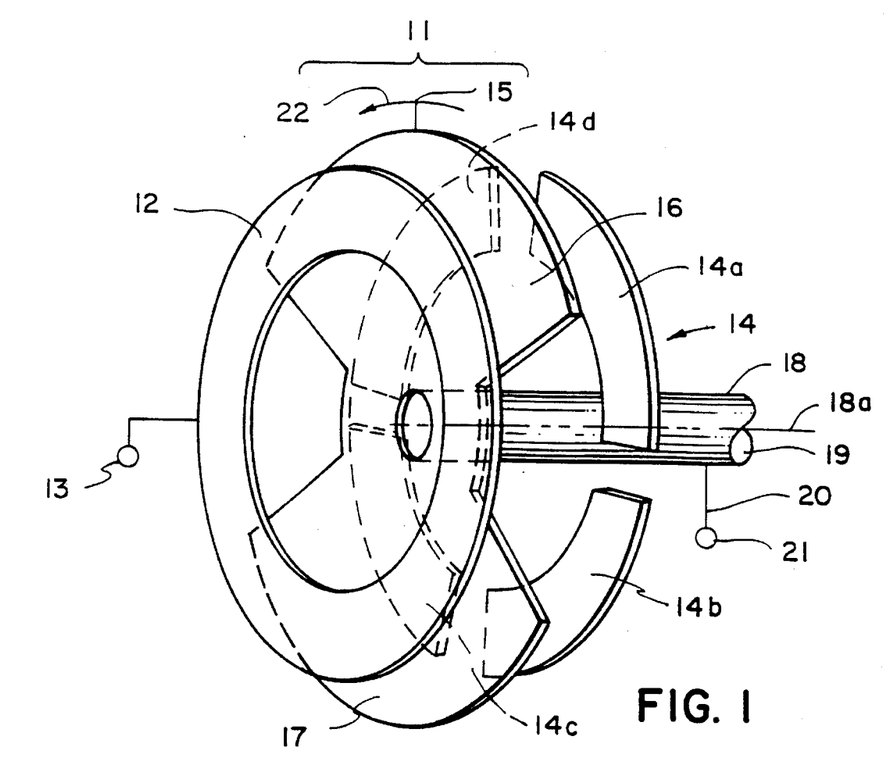
FIG. 1 is a perspective view of conductive electrodes of a capacitive transducer in accordance with a preferred embodiment of the present invention.
Figure 1A:
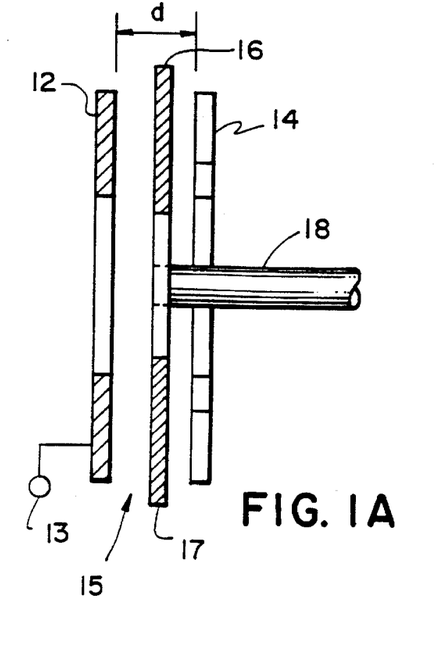
FIG. 1A is a cross-section of the electrodes shown in FIG. 1.

Referring now to FIGS. 1 and 1A, a capacitive transducer 11, includes a first annular stationary electrode 12, connected to a terminal 13, and a second stationary surface 14, comprising four arcuate conductive sensing regions symmetrically disposed about the axis 18a shared with electrode 12. The gap between surfaces 12 and 14 is usually in the range from 0.020" to 0.100." A third rotatable electrically conducting plate 15 is interposed in the gap. Plate 15 includes two conductive lobes 16 and 17 forming a butterfly which shades portions of the conductive regions 14a, 14b, 14c, and 14d from any electrical field lines created by annular electrode 12. As shown in FIG. 1A, the diameter of the lobes is larger that the outside diameter of surfaces 12 and 14. Plate 15 is mounted on a metallic drive shaft 18, which pivots about the axis common to electrode 12 and surface 14, and is connected at section 19 to a source of motive power, such as an optical scanning motor. A flexible wire or sliding connector 20 is used in conjunction with shaft 18 to form an electrical connection between plate 15 and an external terminal 21.

Lobes 16 and 17 are made of a steel plate (aluminum or brass) 8 mill thick and are surrounded by a 7 mill air gap on either side. Shaft 18 made of steel has ⅛" diameter. Electrodes 14a, 14b, 14c and 14d are made of copper. All surfaces are made with a perfect symmetry.

Figure 2:
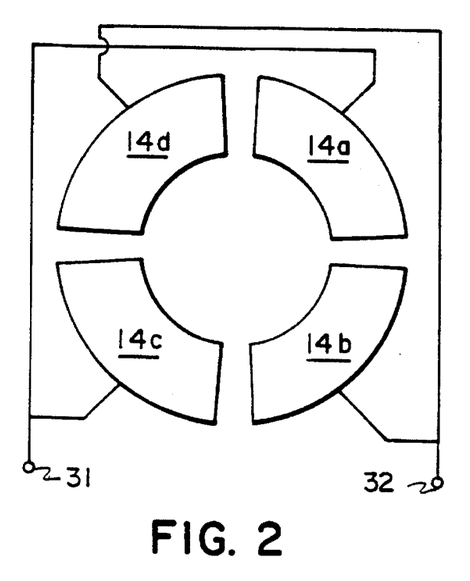
FIG. 2 is a plan view of the sensing electrodes shown in FIGS. 1 and FIG. 1A, including the manner in which they are connected to their terminals.

FIG. 2 shows diametrically opposite conductive regions 14a and 14c connected to an output terminal 31 and the remaining diametrically opposite conductive regions 14b and 14d connected to a second output terminal 32. The electrical capacitance that is created between terminals 13 and 31 may be viewed as made up of three components: 1) the capacitance $C_{a1}$ between electrode 12 and the exposed areas of the conductive regions 14a and 14c when the rotor is at its center position; 2) the added capacitance $C_a$ between electrode 12 and the exposed areas of the conductive regions 14a and 14c when plate 15 rotates in the direction indicated by arrow 22; and, 3) the additional stray capacitance $C_{sa}$ created between terminals 13 and 31. Similarly, the electrical capacitance created between terminals 13 and 32 may be viewed as made up of corresponding components $C_{b1}$, $C_b$, and $C_{sb}$, except that $C_b$ decreases as plate 15 rotates in the direction indicated by arrow 22.

Figures 3, 4:
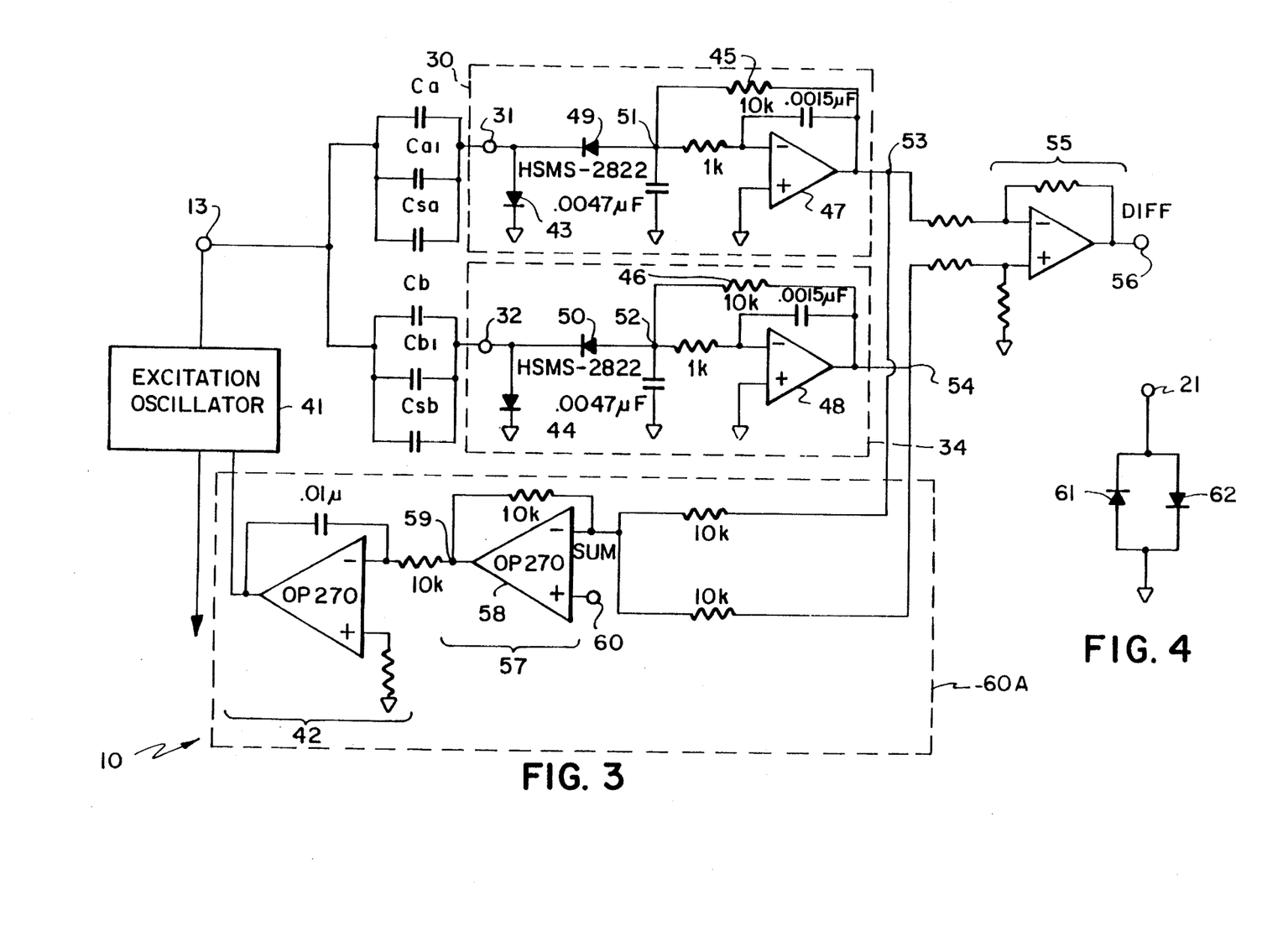
FIG. 3 is a schematic of a control system of the transducer designed for high transducer stability.
FIG. 4 is a schematic of an alternative method of making a connection to electrical ground.
Figure 3A:
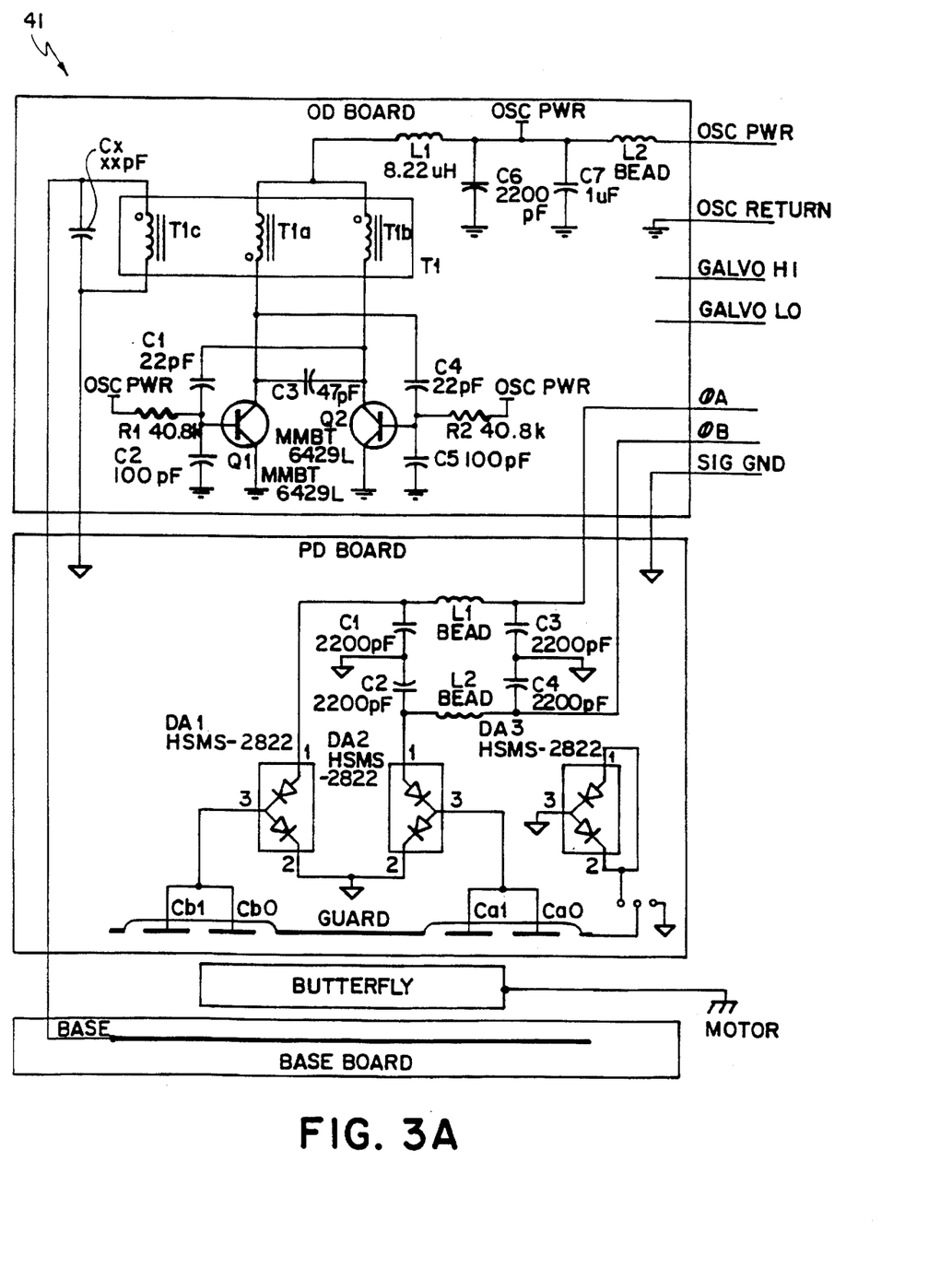
FIG. 3A is a schematic of an excitation oscillator and connections of the electrodes of the transducer.

FIG. 3 shows one embodiment of the sensing circuit used to achieve the overall stability of the capacitive sensor apparatus. Terminal 13 is connected to a source which is an excitation oscillator 41, which typically operates at a frequency of about 10 MHz, partially determined by the capacitive load applied between terminal 13 and ground potential, and oscillates with an amplitude of about 100 Volts. However, frequencies in the range of 2 MHz to 100 MHz are feasible. The schematics of the source is shown in FIG. 3A including source electrode 12 (base board), plate 15 (butterfly) and the arcuate conductive regions 14a, 14b, 14c, and 14d.

Figure 5:
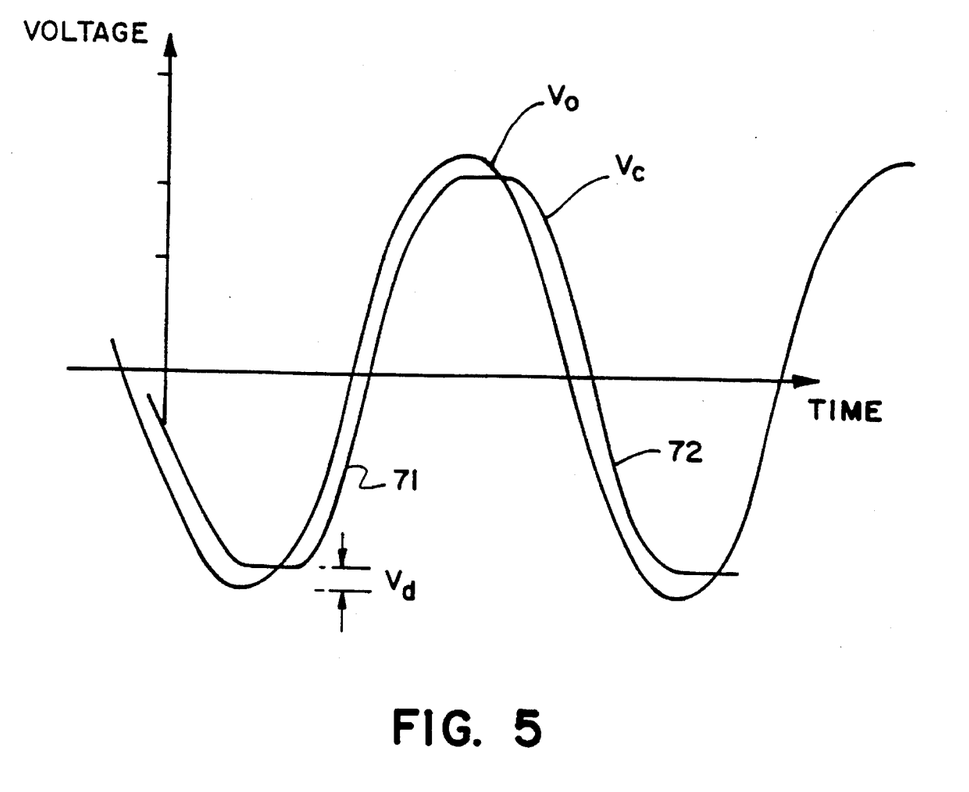
FIG. 5 illustrates the variation of excitation voltage and the voltage developed at the transducer electrodes, as a function of time, for the control system of FIG. 3.

When the voltage applied to terminal 13 increases and is about one voltage drop V above the voltage V held across the electrodes of capacitors $C_{a1}$, $C_a$, $C_{sa}$, $C_{b1}$, $C_b$, and $C_{sb}$, as shown in branch 71 of FIG. 5, capacitors $C_{a1}$, $C_a$, $C_{sa}$, $C_{b1}$, $C_b$, and $C_{sb}$ acquire charge by a current flow to ground through diodes 43 and 44. When the voltage applied to terminal 13 decreases and is about one diode voltage drop $V_d$ below the voltage $V_c$ held across the electrodes of capacitors $C_{a1}$, $C_a$, $C_{sa}$, $C_{b1}$, $C_b$, and $C_{sb}$, as shown in branch 72 of FIG. 5, capacitors $C_{a1}$, $C_a$, $C_{sa}$, $C_{b1}$, $C_b$, and $C_{sb}$ discharge by flowing current through the feedback resistors 45 and 46 of operational amplifiers 47 and 48 through diodes 49 and 50.

The forward and feedback paths of the operational amplifiers 47 and 48 are connected so that junctions 51 and 52 are held at ground potential. Consequently, conductive regions 14a, 14b, 14c and 14d are very nearly at the same electrical potential as electrode 15. With somewhat more elaborate circuitry, junctions 31 and 32 can be held at ground potential, instead of junctions 51 and 52, to ensure that electrode 15 and the conductive regions 14a, 14b, 14c and 14d are at the same electrical potential.

Alternatively, terminal 21 can be connected to two back-to-back diodes 61 and 62 that connect to ground, as shown in FIG. 4, to raise or lower electrode 15 to the same potential as junctions 31 and 32.

The outputs at junctions 53 and 54 of operational amplifiers 47 and 48 are voltages proportional to the amplitude of the currents flowing through terminals 31 and 32. The voltages at junctions 53 and 54 are applied to a differential circuit 55, to generate a signal at terminal 56 proportional to the difference of the sensed currents. The difference is used to determine position of lobes 16 and 17 in respect to regions 14a, 14b, 14c, and 14d.

The voltages at junctions 53 and 54 are also applied to a summing circuit 57 including operational amplifier 58, to generate an error voltage at junction 59, proportional to the difference between 1) the sum of the sensed currents and 2) a reference value represented by a voltage applied to terminal 60 of amplifier 58. The error voltage at junction 59 is integrated using the circuit 42. The output of the integrator 42 controls either the amplitude $V_o$ or the frequency $f_o$ of the excitation oscillator 41.

Figure 6:
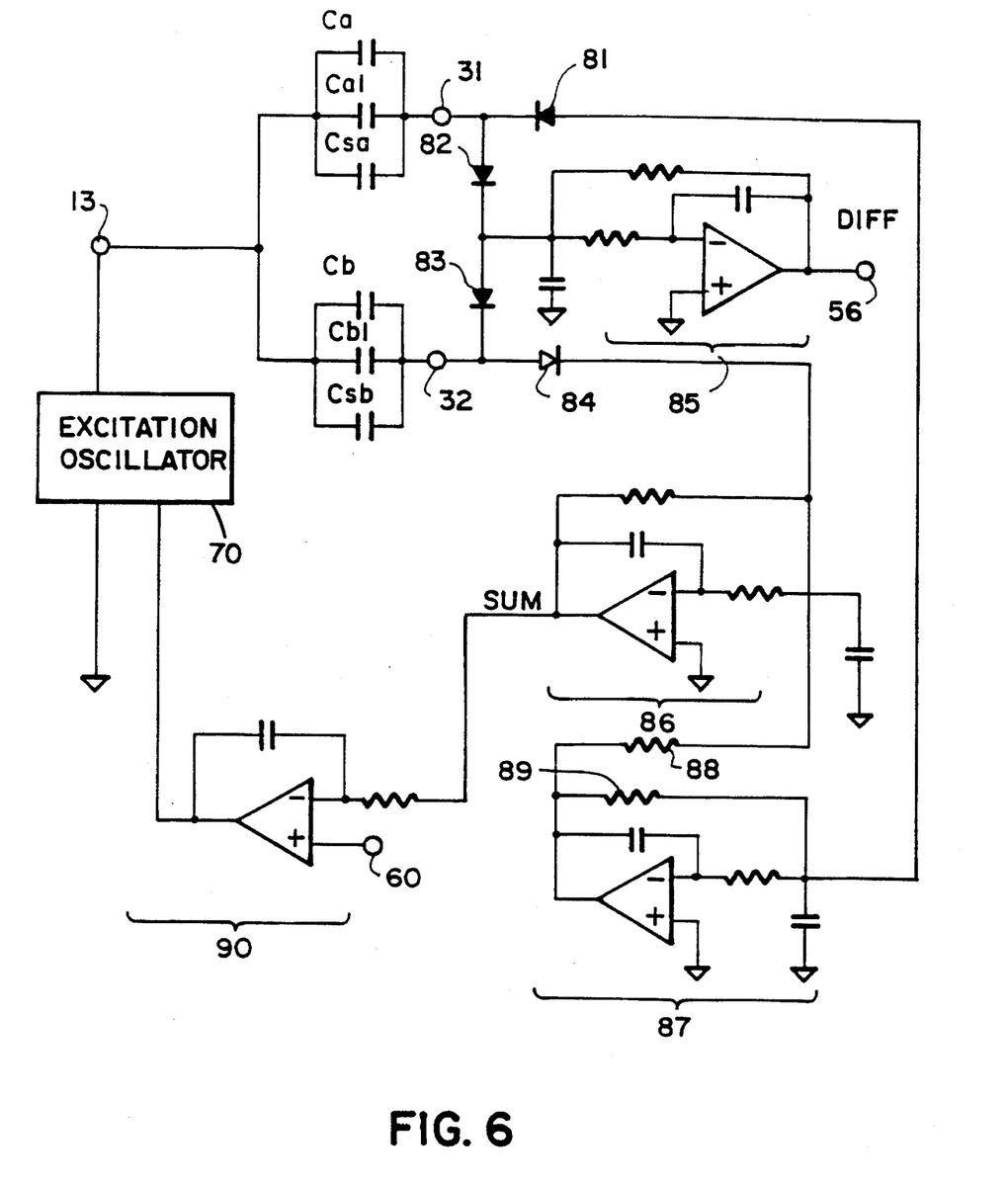
FIG. 6 is a schematic of an alternative embodiment of the control system of the transducer.

An alternative method for detecting the current flow through terminals 31 and 32 is shown in FIG. 6. In this configuration, capacitances $C_{a1}$, $C_a$ and $C_{sa}$ acquire charge through diode 82. Capacitances $C_{b1}$, $C_b$, and $C_{sb}$ discharge through diode 83. The net charge, which flows into the summing junction of amplifier 85, is equal to the difference of the two charges and therefore is proportional to the difference between the sum of capacitances $C_{a1}$, $C_a$ and $C_{sa}$ and the sum of capacitances $C_{b1}$, $C_b$, and $C_{sb}$. The output of the transimpedance amplifier 85 is a voltage with the average value proportional to mechanical rotation. Capacitances $C_{a1}$, $C_a$ and $C_{sa}$ discharge through diode 81 into the summing junction of transimpedance amplifier 87. The current flowing into the summing junction of transimpedance amplifier 87 is inverted by amplifier 87 and resistor 88 and summed with the current resulting from capacitances $C_{b1}$, $C_b$, and $C_{sb}$ acquiring charge through diode 84. The output of transimpedance amplifier 86 is a voltage proportional to the sum of capacitances $C_{a1}$, $C_a$, $C_{sa}$, $C_{b1}$, $C_b$, and $C_{sb}$. In this method, only two resistors, 88 and 89, require precision matching. As before, the output is compared to a reference 60, the difference is integrated by integrator 90, and the output of the integrator 90 controls either the amplitude $V_o$ or the frequency $f_o$ of the excitation oscillator 70.

As described above, rotating plate 15 and arcuate electrode regions 14a, 14b, 14c and 14d are maintained at the same electrical potential, which is close to or equal to ground. This assures that variations in the spacing of rotating plate 15 away from the arcuate electrode regions have minimal effect on the electric field, and therefore on the capacitance, that is created between annular electrode 12 and the areas of the arcuate electrodes that are not shielded by the rotating electrode.

The difference of the sensed currents used to determine the position of shaft 18 is as follows:

$$I_{Difference} = I_{a1} - I_{b1} + [(I_a - I_b)\theta] + I_{sa} - I_{sb}$$

wherein $I_{a1}$ and $I_{b1}$ are the sensed currents at the sensing terminals when $\theta = 0$, i.e., when the shaft is at its center position; $I_a$ is the sensed current per unit of shaft rotation at sensing terminal 31; $I_b$ is the sensed current per unit of shaft rotation at sensing terminal 32, usually very nearly equal to $(-I_a)$; $I_{sa}$ is the stray current that flows due to stray capacitance between the annular electrode and the first sensing circuit 30, $I_{sb}$ is the stray current that flows due to stray capacitance between the annular electrode and the second sensing circuit 34; and θ is angular displacement of the rotating shaft. The diameter of rotating lobes 16 and 17 is larger then the diameter of the arcuate electrode regions and the radial edges are kept away from the vicinity of the ends of the arcuate electrodes over the working angular excursion of the transducer; this virtually eliminates parasitic effects and preserves $I_a$ and $I_b$ constant over the entire working angular excursion of the transducer. By ensuring symmetry of the arcuate electrodes and the circuits connected to the two sensing terminals, both $I_{a1}$ and $I_{b1}$, and $I_{sa}$ and $I_{sb}$ can be made very nearly identical. When $I_a$ and $I_b$ are constant, $I_{a1}=I_{b1}$, $I_{sa}=I_{sb}$, and $I_{Difference}$, detected at terminal 56, is proportional to shaft rotation.

The sum of the sensed currents from sensing circuits 30 and 34 is as follows:

$$I_{sum}=I_{a1}+I_{b1}+[(I_a+I_b)\ \theta]+I_{sa}+I_{sb}$$

By using a single dielectric, fluid or vacuum, in the active transducer gaps and by ensuring symmetry of the transducer geometry, the absolute values of $I_a$ and $I_b$ are matched with great precision, even in the presence of temperature and humidity changes. Then, $$I_{sum}=I_{a1}+I_{b1}+I_{sa}+I_{sb}$$

and $I_{sum}$ is made independent of shaft rotation. By further placing the sensing circuits at ground potential, avoiding the use of any dielectric other than air between sensing electrodes 14a, 14b, 14c, and 14d and annular electrode 12, the sum of the sensed currents at constant $V_o$ gives a precise quantitative indication not only of changes in the gain of the transducer that may have occurred due to heat transfer, aging, or changes in ambient temperature or humidity, but of changes that may have occurred in the source of transducer excitation as well. Therefore, the sum of the sensed currents is used as a control signal in feedback loop 60A, to modify the value of $V_o$ and keep the sum invariant. By ensuring that the sum of sensed signals is invariant, the difference of sensed signals at any given rotor position also remains invariant in the presence of the above-described perturbing influences. Thus feedback loop 60A provides a suitable error compensation scheme. To reduce noise, all elements of the transducer that are not grounded are properly shielded. The 100 V line supplying power to electrode 12 is also shielded at ground.

Figure 7:
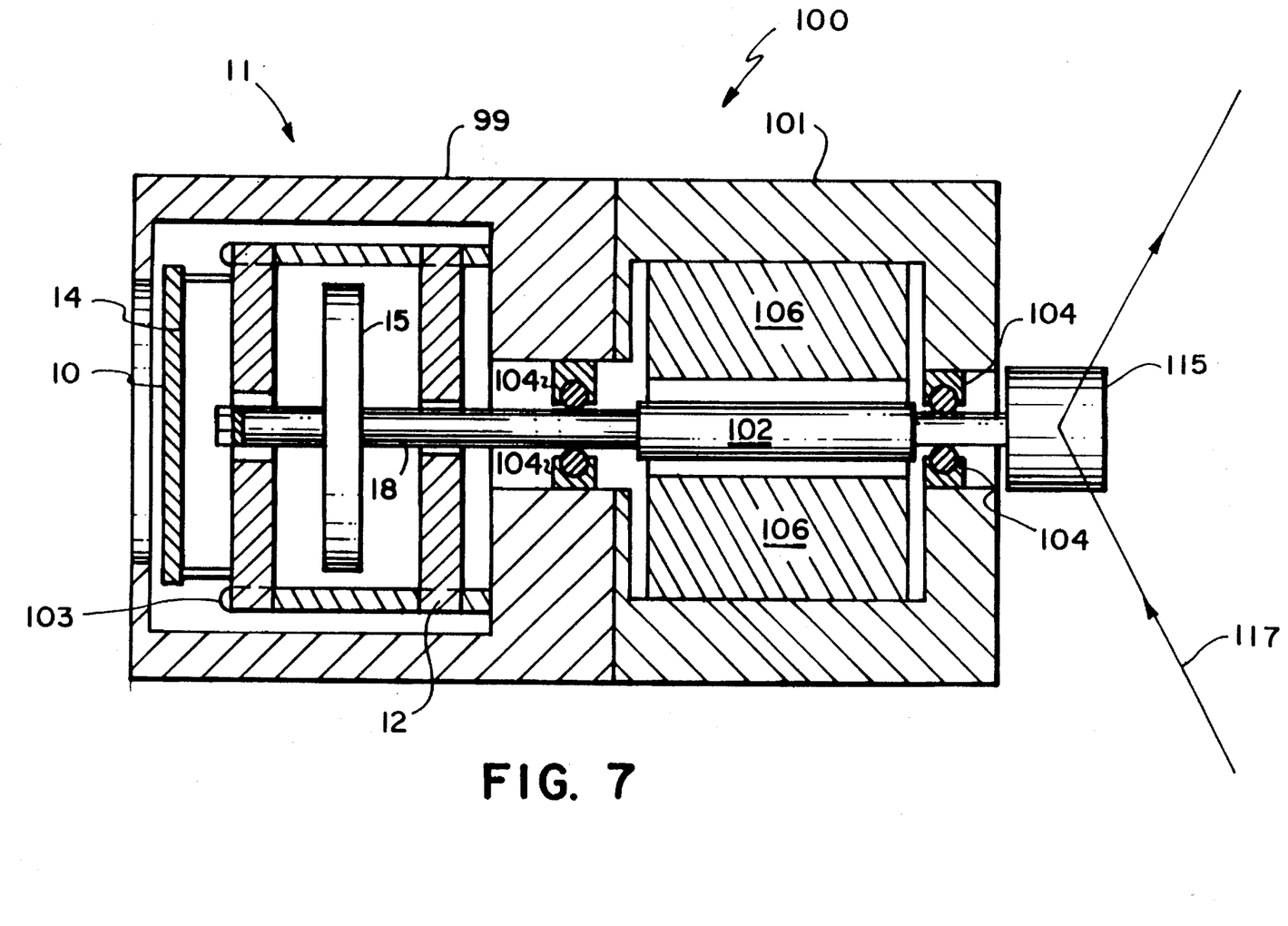
FIG. 7 is a cross-sectional drawing of the capacitive transducer controlling a motor that drives a mirror.

Referring to FIG. 7, capacitive transducer 11 governs a motor 100 that drives an oscillating mirror 115 that, in turn, deflects a beam 117. Shaft 18 mounted on bearings 104 is connected to a rotor 102 that oscillates within the cavity of a stator 106. Motor 100 located in housing 101 and transducer 11 located in housing 99 are each properly shielded for optimal performance. The transducer circuitry 10 is located near sensing surface 14 that is maintained in a proper position with respect to surface 12 by a screw 103. The arrangement of motor 100 and its coupling to transducer 11 may also be achieved as is described either in the U.S. Pat. No. 5,099,386 issued Mar. 24, 1992 or in U.S. patent application Ser. No. 07/660,705 filed Feb. 25, 1991 both of which are incorporated by reference as if fully set forth herein. These documents also teach the optimal arrangement of the electrode interconnections and bearings 104. Furthermore, to minimize noise on the transducer, it is important to twist together wire connectors to the drive coil and properly ground rotor 102 described in the 07/660,705 application.

While the preferred embodiment uses four capacitances arranged for detection of the rotary position of a shaft, the described concept can be extended to a larger number of capacitances suitably arranged to detect rotational or translational movement. Furthermore, the capacitance surfaces can be cylindrical or semi-spherical. The feedback compensation scheme may use, instead of the sum signal, some other suitable functional dependence of signals sensed at the sensing regions.

Other embodiments are within the scope of the following claims:

I claim:

1. A variable capacitance transducer for detecting position of a moving member including:

a first stationary conductive source surface, connected to a source of oscillating electrical energy;

a second stationary surface, spaced apart from said first surface by a gap, comprising a plurality of electrically conductive sensing regions cooperatively arranged with said source surface;

a third movable conductive surface, connected to said moving member, located between said first source surface and said plurality of sensing regions;

said third conductive surface shaped and arranged to limit the amount of electrical energy transferred from said source surface to said plurality of sensing regions in direct dependence with a relative position of said third surface respective to said first and second surfaces;

an electrical connecting circuit, connected to said sensing regions and said third surface, adapted to maintain said sensing regions and said third surface at substantially the same potential;

an electrical measurement circuit, connected to each of said sensing regions, constructed and arranged to measure said relative position of said third surface based on the amount of energy simultaneously received by individual sensing regions; and an electrical control circuit, connected to said electrical measurement circuit and said source in a feedback arrangement, constructed to control the amount of energy said source applies to said source surface based on the amount of energy received by said sensing regions.

2. The capacitance transducer of claim 1 wherein said measurement circuit is constructed and arranged to measure the difference of energy received by said sensing regions to determine said relative position.

3. The capacitance transducer of claim 2 wherein said measurement circuit is further constructed and arranged to measure the sum of energy received by said sensing regions.

4. The capacitance transducer of claim 3 wherein said control circuit utilizes the sum of energy to control the amount of energy said source applies to said source surface.

5. The capacitance transducer of claim 1, 2, 3 or 4 wherein said third conductive movable surface is adapted to rotate with respect to said first and second surfaces.

6. The capacitance transducer of claim 5 further comprises:

a first electrical output terminal connected to a first set of regions of said second surface;

a second electrical output terminal connected to a second set of regions of said second surface; and said third surface has a shape that said third surface, when rotating, increases the area of said first set of regions exposed to said first surface and symmetrically decreases the area of said second set of regions exposed to said first surface.

7. The capacitance transducer of claim 6 wherein said first conductive source surface is flat and defined by two concentric circles with an identical axis of symmetry;

said electrically conductive sensing regions of said second surface being four arcuate flat regions defined by arcs of two concentric circles with said axis of symmetry; and said shape of said third surface being symmetric about said axis and including at least two lobes defined by arcs of a circle centered at said axis.

8. The capacitance transducer of claim 7 wherein the circle defining said lobes has a larger diameter than the diameter of the outer circle defining said sensing regions.

9. The capacitance transducer of claim 4 wherein said control circuit controls the amplitude of voltage applied by said source to said source surface.

10. The capacitance transducer of claim 4 wherein said control circuit controls the oscillating frequency of the energy applied by said source to said source surface.

11. The capacitance transducer of claim 1 wherein said electrical connection circuit comprises a one or more switching elements coupled to said third conductive surface.

12. The capacitance transducer of claim 1 further comprising two diodes connected in parallel to said third surface in opposite polarity.

13. The capacitance transducer of claim 12 wherein said parallel-connected diodes are connected between said third surface and ground potential.

14. A variable capacitor transducer apparatus comprising:

a first stationary conductive surface, in a dielectric fluid or a vacuum, connected to a source of oscillating voltage;

a second stationary surface spaced away from said first surface by a constant gap and divided into a plurality of pairs of electrically conductive regions, each one said region of said pairs connected to a first electrical output terminal, and each other said region of said pairs connected to a second output terminal;

a third conductive surface, interposed between said first surface and said second surface, connected to said moving member and adapted to move in translation or rotation, said third conductive surface being shaped in a manner that its movement in one direction causes an increase of the area of said regions connected to said first terminal that said first surface exposes without obstruction by said third surface, and said motion causes a symmetrical decrease of the area of said regions connected to said second terminal that said first surface exposes without obstruction by said third surface;

a first electrical means for maintaining said regions of said second surface and said third surface at substantially the same potential;

a second electrical means, connected to said terminals, for measuring a position of said third surface based on the amplitude of the difference of the oscillating charge flowing through the said first and second output terminals;

a third electrical means, connected to said terminals, for measuring the amplitude of the sum of the oscillating charge flowing through the said first and second output terminals; and a fourth electrical means, connected to said third means and said source, for controlling said source of oscillation voltage in a manner that the said amplitude of the sum of oscillating charge flow remains constant.

15. The capacitance transducer of claim 1 or 14 wherein said source generates alternating voltage of frequency in the range of 2 MHz to 100 MHz.

16. The capacitance transducer of claim 1 or 14 connected to a motor that has a roto, wherein rotation of the rotor of said motor is controlled by a position signal from said transducer.

17. The capacitance transducer of claim 14 wherein said first electrical means comprises one or more switching elements coupled to said third conductive surface.

18. The capacitance transducer of claim 14 further comprising two diodes connected in parallel to said third surface in opposite polarity.

19. The capacitance transducer of claim 18 wherein said parallel-connected diodes are connected between said third surface and ground potential.

* * * * *

UNITED STATES PATENT AND TRADEMARK OFFICE
CERTIFICATE OF CORRECTION

PATENT NO. : 5,537,109

DATED : July 16, 1996

INVENTOR(S) : Roger D. Dowd

It is certified that error appears in the above-identified patent and that said Letters Patent is hereby corrected as shown below:

The third patent listed "2,534,450, 12/1959, Ergen" should read --2,534,505, 12/1950, Ergen--.

In col. 2, line 8, please delete "$2^{n-}$" and insert --$2^{n-1}$--.

In col. 10, line 33, please delete "roto" and insert --rotor--.

Signed and Sealed this

Twenty-first Day of October 1997

Attest:

BRUCE LEHMAN

Attesting Officer

Commissioner of Patents and Trademarks